United States Patent [19]
Wheatley et al.

[11] Patent Number: 5,429,388
[45] Date of Patent: Jul. 4, 1995

[54] ANGULAR AND FRONTAL ENERGY ABSORBING VEHICLE FRAME STRUCTURE

[75] Inventors: Donald G. Wheatley, Ann Arbor; Hikmat F. Mahmood, Bloomfield Hills, both of Mich.

[73] Assignee: Ford Motor Company, Dearborn, Mich.

[21] Appl. No.: 239,782

[22] Filed: May 9, 1994

[51] Int. Cl.6 .............................................. B62D 7/22
[52] U.S. Cl. ................................... 280/784; 180/271; 296/27
[58] Field of Search ............... 280/784, 781; 180/274, 180/271; 296/35.2, 27, 188, 189

[56] References Cited

U.S. PATENT DOCUMENTS

| | | | |
|---|---|---|---|
| 3,811,698 | 5/1974 | Glance | 280/106 |
| 3,814,470 | 6/1974 | Kicher et al. | 293/70 |
| 3,860,258 | 1/1975 | Fenstel et al. | 280/784 X |
| 3,881,742 | 5/1975 | Felzer | 280/784 |
| 3,912,295 | 10/1975 | Eggert et al. | 280/106 R |
| 4,182,012 | 5/1979 | Reidelbach et al. | 280/784 |
| 4,252,355 | 2/1981 | Goupy et al. | 293/120 |
| 4,355,844 | 10/1982 | Mazzarelli | 280/784 X |
| 4,410,208 | 10/1983 | Muslo et al. | 293/132 |
| 4,684,151 | 8/1987 | Drewek | 280/284 |
| 4,829,979 | 5/1989 | Moir | 293/132 |
| 5,201,912 | 4/1993 | Terada et al. | 293/120 |

FOREIGN PATENT DOCUMENTS 64-160096  2/1991  Japan.

*Primary Examiner*—Margaret A. Focarino
*Assistant Examiner*—Christopher P. Ellis
*Attorney, Agent, or Firm*—Daniel M. Stock; Roger L. May

[57] ABSTRACT

A vehicle frame has longitudinally extending left and right frame members with each member laterally deformable in response to a lateral force component of a preselected magnitude. A front end structure connects the left and right frame members to tie the them together so that both frame members absorb energy by laterally deforming in response to a lateral force component of a preselected magnitude acting on either of the left and right frame members. The front end structure also deforms longitudinally with the left and right frame members.

20 Claims, 4 Drawing Sheets

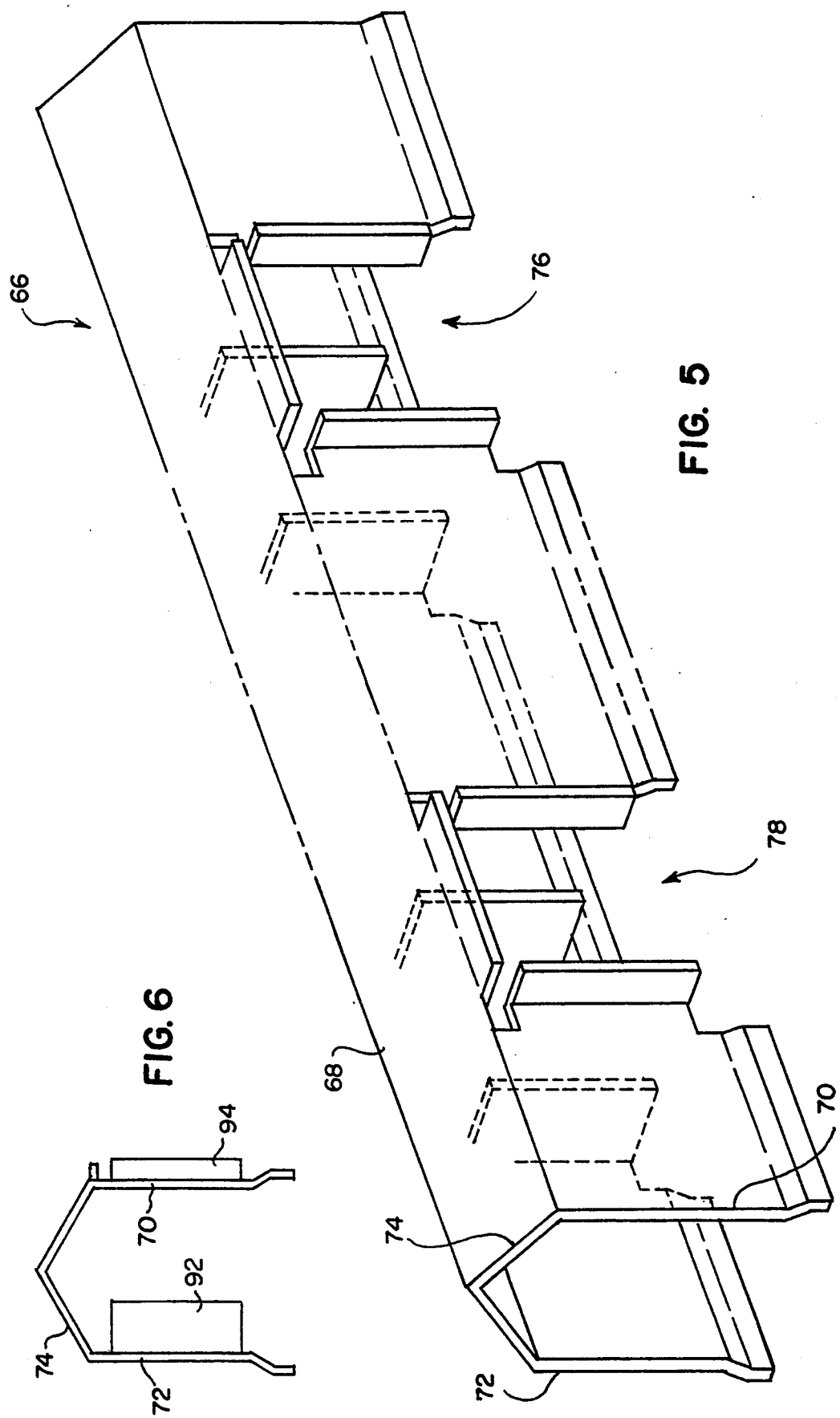

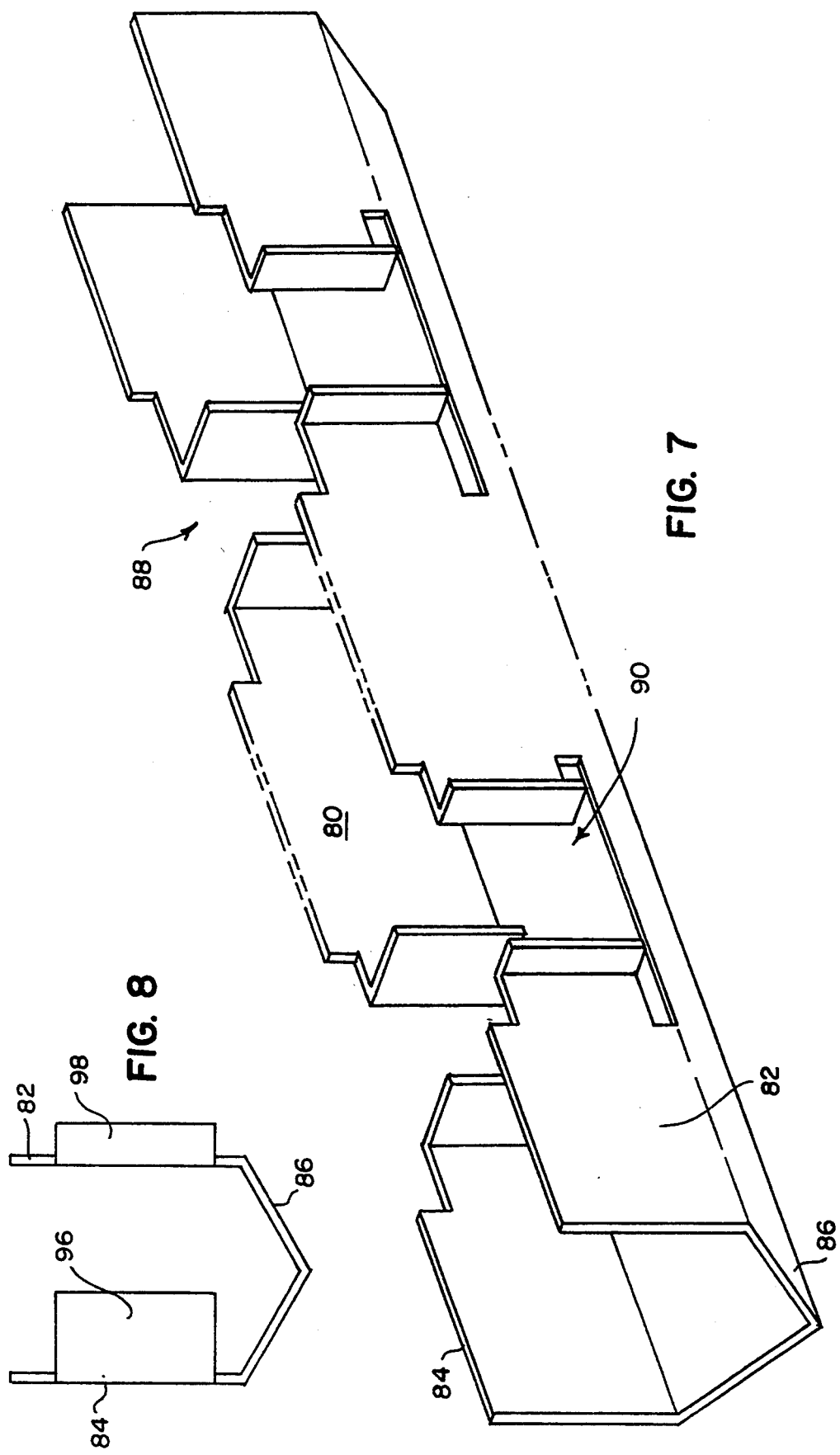

ANGULAR AND FRONTAL ENERGY ABSORBING VEHICLE FRAME STRUCTURE

FIELD OF THE INVENTION

The present invention relates to a vehicle frame configured to absorb energy.

BACKGROUND OF THE INVENTION

The front structure of a vehicle generally absorbs energy using horizontal tubular columns oriented parallel to the vehicle fore-aft axis. These columns collapse axially within a mode which has localized buckling and collapse. The goal is to maximize the energy absorbed which is equal to the crush force (P) times deflection (D), PxD. The P force is dictated by the G curve that is acceptable for the occupant. Assuming a square wave pulse curve, the maximum G load will be about 20 G. The deflection allowable from the structure will be about 0.8 times the crush length, 0.8 L.

Angular energy (30° angular) is absorbed by bending the front structure of the vehicle. An offset load generally buckles the front frame members in a Euler column manner at their bases at the engine cross member. The longer the columns, the more likely the buckling and the lower the energy taken out by the buckling. Longer columns are desirable for frontal energy absorption, but detrimental to angular energy absorption.

One approach to the angular energy absorption is to design a front end beam structure to tie the left and right frame members together. A cross beam properly attached will cause both the left and right frame members to be involved in angular energy absorption. The energy absorbed with the beam structure is significantly more than without a beam structure. Nonlinear finite element analysis has shown the energy absorbed to be twice as high in a 30° angular energy absorption test with a beam.

While the beam improves angular energy absorption, it hinders frontal energy absorption because the beam, when tied conventionally to the front structure, reduces the amount of the front crush and thus requires that the vehicle be lengthened the width of the beam. The added length decreases vehicle aesthetics, function, weight and cost. Accordingly, it will be appreciated that it would be highly deskable to have a front beam structure to tie the left and right frame members together without reducing the frontal crush. It is also desirable to have a structure that ties the left and right frame members together without decreasing the vehicle aesthetics, function, weight or cost.

SUMMARY OF THE INVENTION

The present invention is directed to overcoming one or more of the problems set forth above. Briefly summarized, according to one aspect of the present invention, a vehicle frame comprises a longitudinally extending left frame member having a middle portion and a front end portion with a front end face, the left frame member being laterally deformable in response to a lateral force component of a preselected magnitude; a longitudinally extending right frame member having a middle portion and a front end portion with a front end face, the right frame member being laterally deformable in response to a lateral force component of a preselected magnitude; and a front end structure connected to the front end portions of the left and right frame members to tie the left and right frame members together so that both the left and rights frame members absorb energy by laterally deforming in response to a lateral force component of a preselected magnitude acting on either of the left and right frame members.

A feature of the present invention is that the left and right frame members deform longitudinally and the front end structure also deforms longitudinally to contribute to orderly longitudinal deformation of the left and right frame members. In one embodiment of the invention, this feature is achieved by a front end structure that includes a backing plate having left and right openings for fitting over the front end portions of the left and right frame members, and a cap having top and bottom members and a front member extending between the top and bottom members. In absorbing energy, the front member transmits longitudinal force components to the top and bottom members which collapse away from the left and right frame members and do not interfere with deformation of the left and right frame members.

In another embodiment of the invention, this feature is achieved by a front end structure that includes an upper member having a front panel, a rear panel with left and right openings for fitting the front end portions of the left and right frame members, and a top panel extending between the front and rear panels; and a lower member having a front panel, a rear panel with left and right openings for fitting the front end portions of the left and right frame members, and a top panel extending between the front and rear panels. In absorbing energy, the front panels transmit longitudinal force components to the top and bottom panels which collapse away from the left and right frame members and do not interfere with deformation of the left and right frame members.

The configuration of the front end structure does not increase frame length because it does not extend beyond the frame. Also, it deforms in frontal energy absorption without hindering deformation of the frame members.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 5 is a diagrammatic perspective view of another embodiment of a front end structure showing a top member of the structure.

FIG. 6 is a left end view of the top member of FIG. 5.

FIG. 7 is a perspective view similar to FIG. 5 but illustrating a bottom member of the structure.

FIG. 8 is a left end view of the bottom member of FIG. 7.

DETAILED DESCRIPTION OF THE PREFERRED EMBODIMENTS

Figure 1:
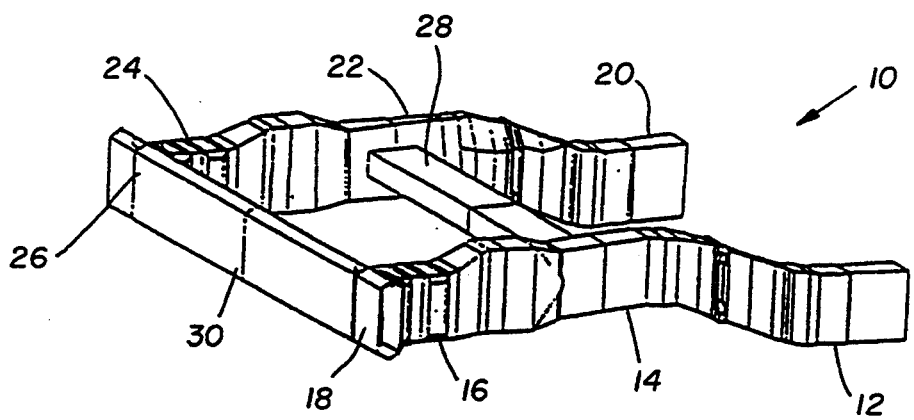
FIG. 1 is a diagrammatic view of a preferred embodiment of a vehicle frame with a front end structure according to the present invention.

Referring to FIG. 1, a vehicle frame 10 has a longitudinally extending left frame member 12 with a middle portion 14 and a front end portion 16 with a front end face 18. The frame 10 has a longitudinally extending right frame member 20 that has a middle portion 22 and a front end portion 24 with a front end face 26. The front end portions 16, 24 are laterally deformable in response to a lateral force component of a preselected magnitude. The left and right frame members 12, 20 are longitudinally deformable. It is known in the art how to construct frame members which controllably deform along their lengths. A middle frame member 28 extends laterally between the left and right frame members 12, 20 and is connected to the middle portions 14, 22 of the left and right frame members. The vehicle frame 10 is constructed so that the left and right frame members 12, 20 are laterally deformable, forward of the middle frame member 28, in response to a lateral force component.

Figure 2:
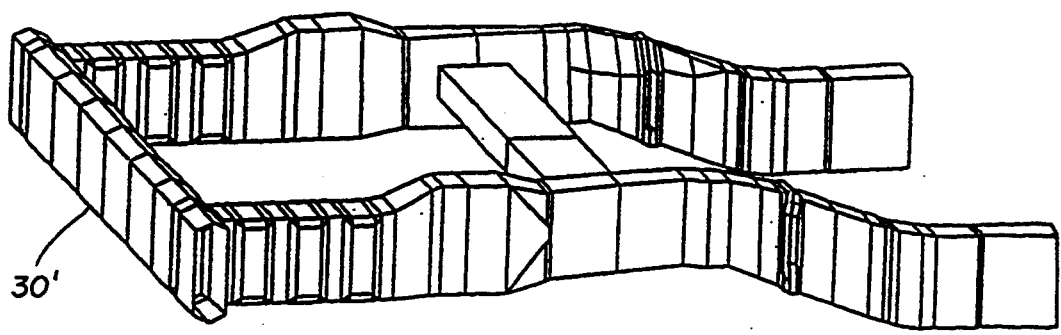
FIG. 2 is a diagrammatic view similar to FIG. 1, but illustrating another embodiment.

A front end structure 30 connects the front end portions 16, 24 of the left and right frame members 12, 20 to tie the left and right frame members together so that both the left and right frame members absorb energy by laterally deforming, forward of the middle frame member 28, in response a lateral force component of a preselected magnitude acting on either of the frame members 12, 20. By this construction, an angular impact on one of the front end portions 16, 24 will cause the front end structure 30 to deform a preselected amount before energy is transferred to the nonimpacted front end portion. The front end structure may deform at a single point (FIG. 1) or at multiple points (FIG. 2).

Figure 3:
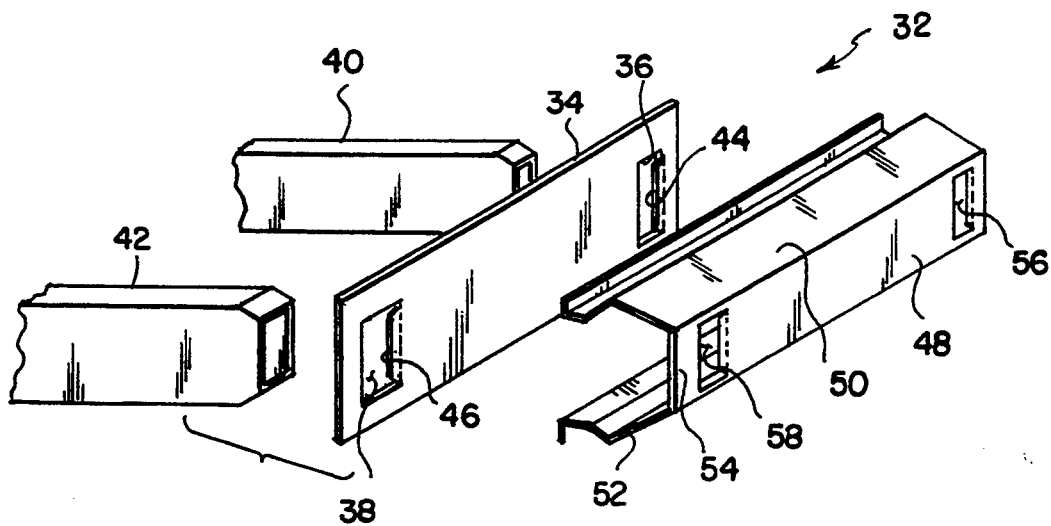
FIG. 3 is an exploded view of a front end structure.

Referring to FIG. 3, the front end structure 32 includes a backing plate 34 that has left and right openings 36, 38 for fitting over the front end portions of the left and right frame members 40, 42. Flanges 44, 46 about the backing plate openings 36, 38 are used for fastening the backing plate 34 to the left and right frame members 40, 42. Preferably, the flanges 44, 46 protrude from the rear of the backing plate 34 and are fusion welded to the frame members 40, 42.

Figure 4:
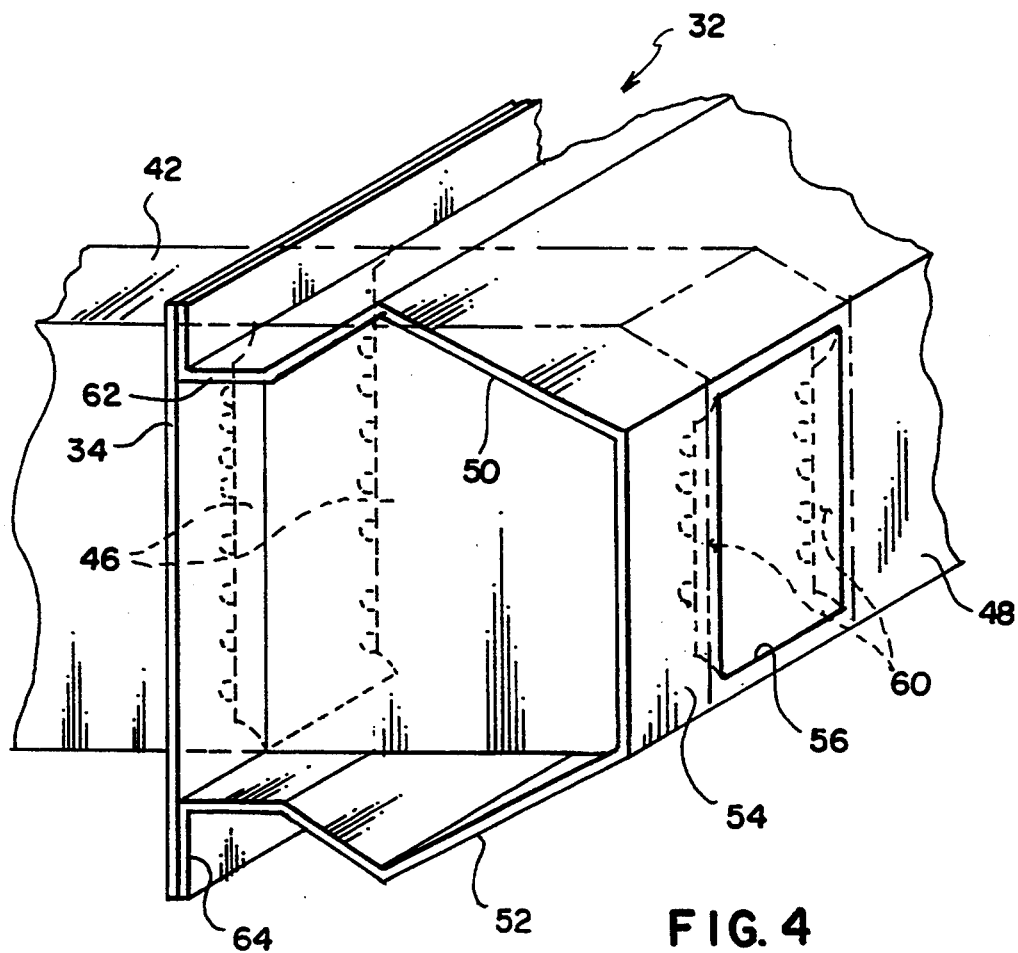
FIG. 4 is a somewhat enlarged assembled view of one end of the front end structure of FIG. 3.

Referring to FIG. 4, the front end structure 32 also includes a cap 48 that has top and bottom members 50, 52 and a front member 54 that extends between the top and bottom members 50, 52. The front member 54 has a right opening 56 for fitting over the front end portion of the right frame member 42. The cap 48 has a right opening 58 with flanges 60 for fastening the cap 48 to the right frame member 42. Preferably, the flanges 60 protrude from the rear of the cap 48 toward the backing plate 34 into the open ends of the right frame member 42 to which the flanges 60 are fusion welded.

The cap top member 50 has a single L-shaped flange 62 along its length for connecting the cap 48 to the backing plate 34 and right frame member 42 at a location above the frame member. Connections may be made by spot welds with one leg of the "L" welded to the backing plate and the other leg welded to the right frame member. Similarly, the cap bottom member 52 has a flange 64 for connecting the cap 48 to the backing plate 34 at a location below the right frame member 42. The front member 54 has a similar opening and flanges for attachment to the left frame member 40 so that the structure is identical on each side of the frame.

Referring to FIGS. 3-4, the cap top member 50 and bottom member 52 each have a cross section oriented to deform and urge the front member 32 toward the backing plate 34 in response to a longitudinal force component of a preselected magnitude. The cap top member 50 deforms upward away from the frame members while the cap bottom member 52 deforms downward away from the frame members. By this construction, a front end structure is achieved that transfers side impact forces laterally from one frame member to the other, and, at the same time, is able to deform along the frame axis without hindering longitudinal deformation of the frame. In fact, the front end structure initiates longitudinal deform upon impact. The front end structure is fitted over the frame so that the length of the frame is not increased. As illustrated, the left and right frame members each have a tapered configuration or trigger to initiate deformation. The front end structure deforms with the frame members in the longitudinal direction along the fore-aft axis.

Referring now to FIGS. 5-8, the front end structure 66 includes an upper member 68 that has front and rear panels 70, 72 and a top panel 74 extending between the front and rear panels 70, 72. The top panel 74 has left and right openings 76, 78 for fitting the front end portions of the left and right frame members. The front end structure 66 also includes a lower member 80 that has front and rear panels 82, 84 and a bottom panel 86 extending between the front and rear panels 82, 84. The top panel 86 has left and right openings 88, 90 for fitting the front end portions of the left and right frame members. Flanges 92, 94, 96, 98 positioned about the openings of the upper and lower members are used for fastening the upper and lower members to the frame members by welding or the like. The upper and lower members 68, 80 are of a size such that one of the members fits in the other member to form a box beam structure. Each of the upper and lower members has a cross section oriented to deform and urge the front panel toward the rear panel in response to a longitudinal force component of a preselected magnitude. During frontal energy absorption, the upper member top panel deforms upward away from the frame members while the lower member bottom panel deforms downward away from the frame members.

It can be now appreciated that there has been presented a front beam structure to tie the left and right frame members together without reducing the frontal crush. The structure ties them together so that energy of a side impact is absorbed by both the left and right frame members. Vehicles aesthetics is not compromised because the front end structure does not protrude beyond the frame members and will not interfere with decorative additions. The structure is lighter in weight than a solid beam and can be manufacture of sheet metal components welded together.

The tapered front end portion and face of each frame member form a trigger or collapse initiator that lowers the initial peak of a crush pulse. It is well known that the crush pulse of a typical column has an initial high peak which starts localizing buckling, but once the peak is formed, the deformation from the initial crush starts a deformation wave that initiates subsequent collapses at lower loading. The crush mode will be determined by the trigger and beam dimensions. The initial force to start the collapse is a function of the trigger depth.

The present invention uses the trigger and a beam structure combining the advantages of the cross beam for angular impact without adversely affecting frontal crush. The cross beam is a modified C-channel with welds at its foremost rearmost areas. The center of the beam has an upward pucker to reduce its resistance to crush. The beam will carry moment loading about the vertical axis and yet crush easily along the axis of the frame members. The beam is cut out to not interfere with triggering and crushing in the axial direction. One advantage of the present invention is that it has a relatively massive front cross member that ties the left and right frame members together; yet, the cross member does not interfere with frontal crush. The mechanism that the cross member uses to tie the left and right frame members together is short welds at the very upper/lower front and upper/lower rear of the cross member. By having a crush curve complimentary to the frame members, the cross member helps trigger the frame member buckling. The rear plate of the front beam has a deep fish mouth to assure that the plate does not interfere with movement of the upper and lower frame member surfaces.

While the invention has been described with reference to the preferred embodiments, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

What is claimed is:

1. A vehicle frame, comprising:
   a longitudinally extending left frame member having a middle portion and a front end portion with a front end face, said front end portion of said left frame member being laterally deformable in response to a lateral force component of a preselected magnitude;
   a longitudinally extending right frame member having a middle portion and a front end portion with a front end face, said front end portion of said right frame member being laterally deformable in response to a lateral force component of a preselected magnitude;
   a middle frame member extending laterally between said left and right frame members and being connected to said middle portions of said left and right frame members;
   a front end structure connected to said front end portions of said left and right frame members to tie said front end portions of said left and right frame members together so that both said left and right frame members absorb energy by laterally deforming at a location forward of said middle frame member in response to a lateral force component of a preselected magnitude acting on either of said left and right frame members, said front end structure including a backing plate having left and right openings for fitting over the front end portions of the left and right frame members.

2. A vehicle frame, as set forth in claim 1, wherein said left and right frame members deform longitudinally and said front end structure contributes to orderly longitudinal deformation of said left and right frame members.

3. A vehicle frame, as set forth in claim 1, wherein said front end structure absorbs energy by laterally deforming a preselected amount in response to a lateral force component of a preselected magnitude acting on said front end portions of either of said left and right frame members.

4. A vehicle frame, as set forth in claim 1, wherein each of said front end portions taper toward its respective front end face to thereby provide a collapse initiator.

5. A vehicle frame, as set forth in claim 1, wherein each of said left and right frame members is a box beam with upper and lower surfaces and wherein at said front end portion said upper and lower surfaces taper toward said front end face to thereby provide a collapse initiator.

6. A vehicle frame, comprising:
   a longitudinally extending left frame member having a middle portion and a front end portion with a front end face, said left frame member being laterally deformable in response to a lateral force component of a preselected magnitude;
   a longitudinally extending right frame member having a middle portion and a front end portion with a front end face, said right frame member being laterally deformable in response to a lateral force component of a preselected magnitude;
   a middle frame member extending laterally between said left and right frame members and being connected to said middle portions of said left and right frame members; and
   a front end structure connected to said front end portions of said left and right frame members to tie said left and right frame members together so that both said left and right frame members absorb energy by laterally deforming in response to a lateral force component of a preselected magnitude acting on either of said left and right frame members, said front end structure including:
   a backing plate having left and right openings for fitting over the front end portions of the left and right frame members; and
   a cap having top and bottom members and a front member extending between said top and bottom members.

7. A vehicle frame, as set forth in claim 6, wherein said cap top member has a crosssection oriented to deform and urge said front member toward said backing plate in response to a longitudinal force component of a preselected magnitude.

8. A vehicle frame, as set forth in claim 7, wherein said cap top member deforms upward away from said left and right frame members.

9. A vehicle frame, as set forth in claim 6, wherein said cap bottom member has a crosssection oriented to deform and urge said front member toward said backing plate in response to a longitudinal force component of a preselected magnitude.

10. A vehicle frame, as set forth in claim 9, wherein said cap bottom member deforms downward away from said left and right frame members.

11. A vehicle frame, as set forth in claim 6, wherein said top cap member has a flange for connecting said cap to said backing plate above said left and right frame members.

12. A vehicle frame, as set forth in claim 6, wherein said cap bottom member has a flange for connecting said cap to said backing plate below said left and right frame members.

13. A vehicle frame, as set forth in claim 6, including flanges about said backing plate openings for fastening said backing plate to said left and right frame members.

14. A vehicle frame, as set forth in claim 6, wherein said cap front member has left and right openings for fitting over the front end portions of the left and right frame members and including flanges about said cap member openings for fastening said cap to said left and right frame members.

15. A vehicle frame, comprising:
- a longitudinally extending left frame member having a middle portion and a front end portion with a front end face, said left frame member being laterally deformable in response to a lateral force component of a preselected magnitude;
- a longitudinally, extending right frame member having a middle portion and a front end portion with a front end face, said right frame member being laterally deformable in response to a lateral force component of a preselected magnitude;
- a middle frame member extending laterally between said left and right frame members and being connected to said middle portions of said left and right frame members; and
- a front end structure connected to said front end portions of said left and right frame members to tie said left and right frame members together so that both said left and right frame members absorb energy by laterally deforming in response to a lateral force component of a preselected magnitude acting on either of said left and right frame members, said front end structure including:
  - an upper member having front and rear panels and a top panel extending between said front and rear panels, said rear panel having left and right openings for fitting said front end portions of said left and right frame members; and
  - a lower member having front and rear panels and a bottom panel extending between said front and rear panels, said rear panel having left and right openings for fitting said front end portions of said left and right frame members.

16. A vehicle frame, as set forth in claim 15, wherein said upper and lower members each have a crosssection oriented to deform and urge said front panel toward said rear panel in response to a longitudinal force component of a preselected magnitude.

17. A vehicle frame, as set forth in claim 16, wherein said upper member top panel deforms upward away from said left and right frame members.

18. A vehicle frame, as set forth in claim 16, wherein said lower member bottom panel deforms downward away from said left and right frame members.

19. A vehicle frame, as set forth in claim 15, including flanges about said left and right openings of said upper and lower members for fastening said upper and lower members to said left and right frame members.

20. A vehicle frame, as set forth in claim 15, wherein one of said upper and lower members fits in the other of said upper and lower members to form a box beam.

* * * * *